United States Patent

O'Brien et al.

[11] Patent Number: 5,752,104
[45] Date of Patent: May 12, 1998

[54] MULTI-LAMP FLASH WHEEL AND CAMERA

[75] Inventors: Michael Joseph O'Brien, Rochester; Robert Cooper Bryant, Honeoye Falls; Richard Alexander Colleluori, Rochester, all of N.Y.

[73] Assignee: Eastman Kodak Company, Rochester, N.Y.

[21] Appl. No.: 646,644

[22] Filed: May 2, 1996

[51] Int. Cl.$^6$ .................... G03B 15/04; F21K 5/00
[52] U.S. Cl. .................... 396/191; 396/192; 362/14; 431/359
[58] Field of Search .................... 396/191, 192, 396/193, 197; 362/13, 14, 15; 431/359, 360, 361, 362, 365

[56] References Cited

U.S. PATENT DOCUMENTS

| 2,839,667 | 6/1958 | Cannella | 362/15 |
| 3,003,053 | 10/1961 | Brooks et al. | 362/14 |
| 3,439,158 | 4/1969 | Swada | 240/1.3 |
| 3,837,786 | 9/1974 | McDonough et al. | 362/14 |
| 4,098,565 | 7/1978 | Van De Weijer | 362/14 |
| 4,298,908 | 11/1981 | English et al. | 362/14 |
| 4,347,053 | 8/1982 | Fohl et al. | 431/359 |

*Primary Examiner*—A. A. Mathews
*Attorney, Agent, or Firm*—Roger A. Fields

[57] ABSTRACT

A camera is intended to be used with a multi-lamp flash wheel having flash lamps that are tilted from storage orientations to ignition orientations as the respective lamps are moved to behind a flash emission window. Tilting the flash lamp to its ignition orientation cocks a striker finger, which when released triggers flash ignition.

9 Claims, 5 Drawing Sheets

MULTI-LAMP FLASH WHEEL AND CAMERA

CROSS-REFERENCE TO RELATED APPLICATION

Reference is made to commonly assigned application Ser. No. 08/642,138, entitled MULTI-LAMP FLASH WHEEL AND CAMERA and filed May 2, 1996 in the names of Robert C. Bryant, Richard A. Colleluori and Michael J. O'Brien now U.S. Pat. No. 5,649,242 issued Jul. 15, 1997.

FIELD OF THE INVENTION

The invention relates generally to the field of photography, and in particular to a multi-lamp flash wheel and to a camera including the multi-lamp flash wheel.

BACKGROUND OF THE INVENTION

It is known for a camera to be used with a multi-lamp flash wheel.

For example, prior art U.S. Pat. No. 4,098,565 issued Jul. 4, 1978 discloses a multi-lamp flash wheel in which the flash lamps are arranged radially in a circular array with respective ignition ends of the lamps being relatively close to one another and respective opposite ends of the lamps being relatively far from one another. The circular array of flash lamps is rotated inside a camera to advance the lamps successively into a slot-like recess at the front of the camera. Each one of the lamps is positioned in the recess with its opposite end protruding radially from the recess. A fixed, faceted reflector at opposite sides of the recess reflects flash illumination substantially radially from the lamp in the recess. A percussion spring is located to strike an ignition stem or ferrule of the lamp in the recess to ignite the lamp.

Somewhat similarly, prior art U.S. Pat. No. 4,347,053 issued Aug. 31, 1982 discloses a multi-lamp flash wheel in which the flash lamps are arranged radially in a circular array with respective ignition ends of the lamps being relatively close to one another and respective opposite ends of the lamps being relatively far from one another. In this instance, each one of the lamps is located in a separate combustion chamber The rear of the chamber has a reflective coating which works in combination with a fixed reflector in a camera, when the circular array of flash lamps is rotated to advance the chambers successively to the fixed reflector, to reflect flash illumination substantially radially from the chambers.

SUMMARY OF THE INVENTION

According to one aspect of the invention, a multi-lamp flash assemblage comprising a plurality of flash lamps arranged in respective storage orientations, is characterized by:

support means supporting each one of the flash lamps for movement relative to the other lamps to change the respective lamps from their storage orientations to ignition orientations which are different than the storage orientations. Preferably, the storage orientations of the respective lamps are identical substantially vertical orientations, and the ignition orientations of the respective lamps are identical substantially horizontal orientations. The support means supports each one of the flash lamps to tilt relative to the other lamps to change the respective lamps from their vertical orientations to their horizontal orientations.

According to another aspect of the invention, a camera comprising a plurality of flash lamps arranged in respective storage orientations, is characterized by:

actuation means for moving each one of the flash lamps relative to the other lamps to change the respective lamps from their storage orientations to ignition orientations which are different than the storage orientations; and resilient means for biasing each one of the flash lamps for movement relative to the other lamps to return the respective lamps to their storage orientations from their ignition orientations.

DETAILED DESCRIPTION OF THE INVENTION

The invention is disclosed as being embodied preferably in a multi-lamp flash wheel and in a camera to be used with the multi-lamp flash wheel. Because the features of a multi-lamp flash wheel and a camera are generally known, the description which follows is directed in particular only to those elements forming part of or cooperating directly with the disclosed embodiment. It is to be understood, however, that other elements may take various forms known to a person of ordinary skill in the art.

The Multi-lamp Flash Wheel

Figure 1:
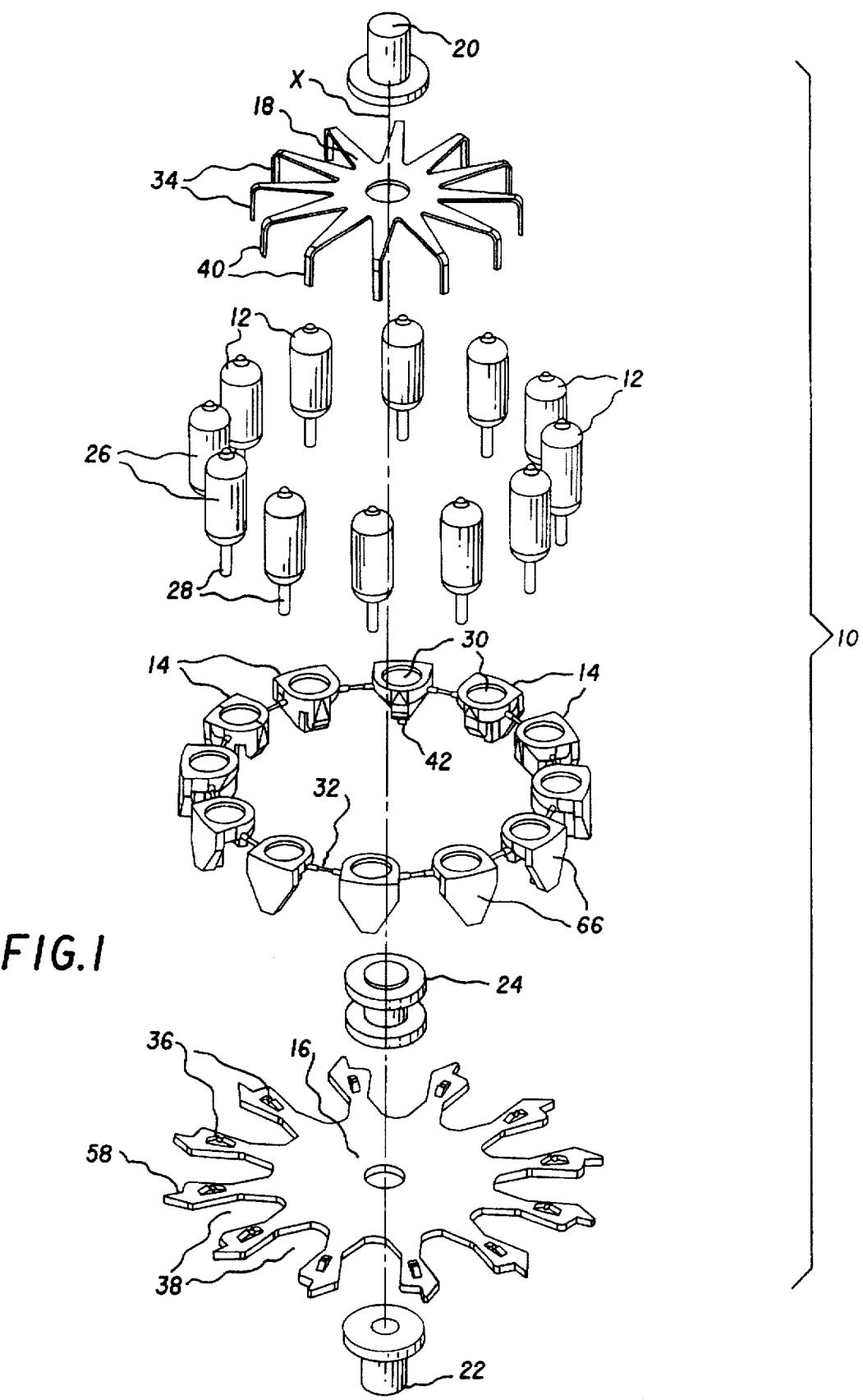
FIG. 1 is an exploded perspective view of a multi-lamp flash wheel consistent with a preferred embodiment of the invention.
Figure 2:
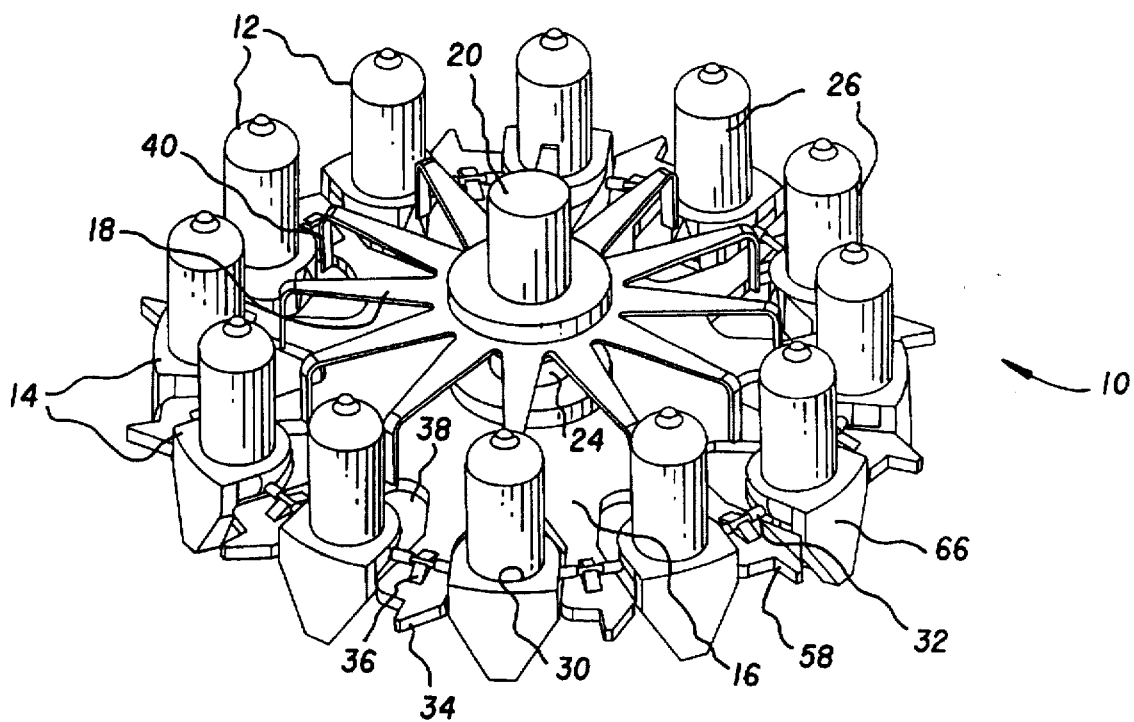
FIG. 2 is a is a top perspective view of the multi-lamp flash wheel.
Figure 3:
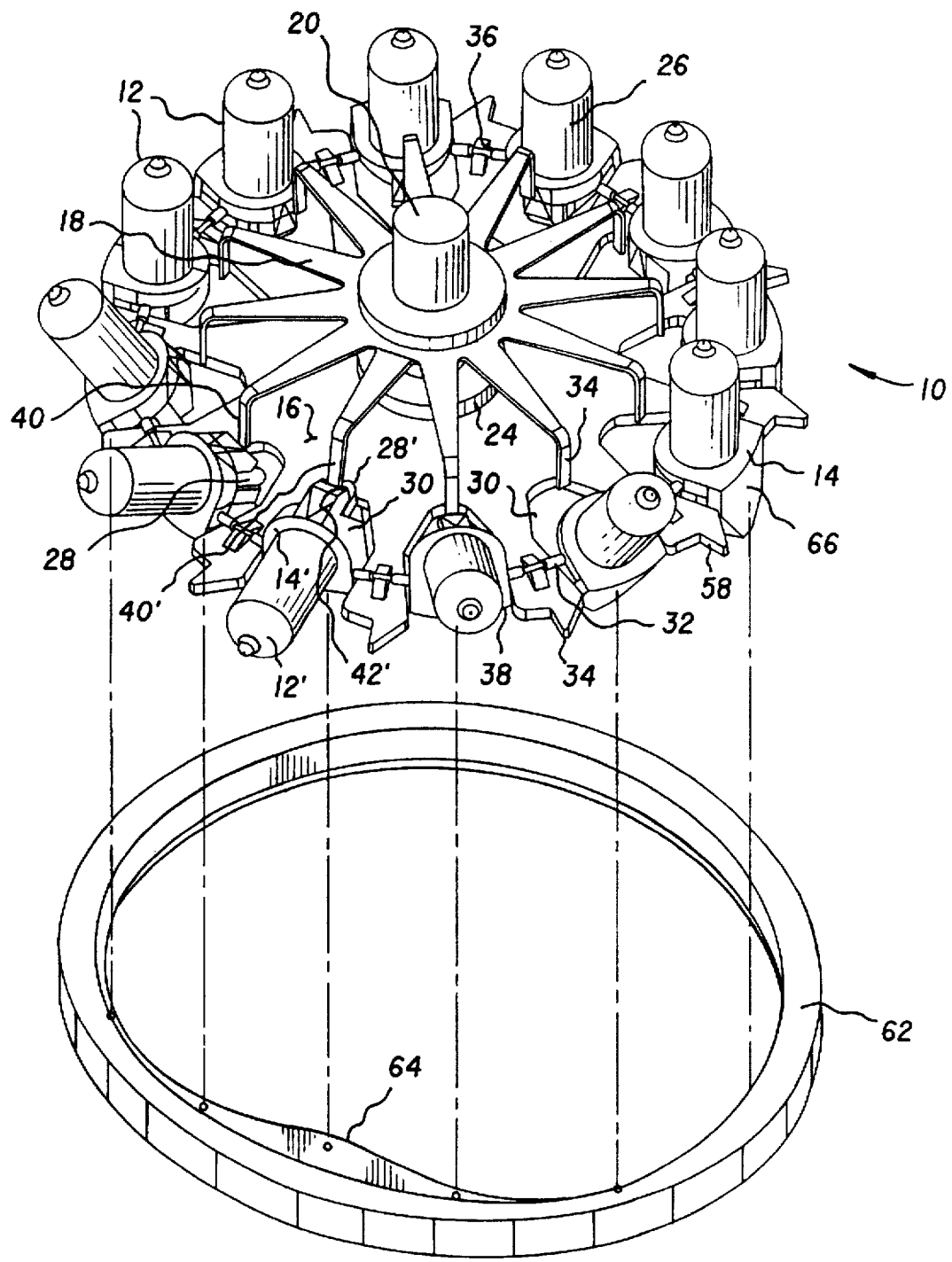
FIG. 3 is a top perspective view of the multi-lamp flash wheel and a fixed cam ring included in a camera to be used with the multi-lamp flash wheel.

Referring now to the drawings, FIGS. 1–3 show a multi-lamp flash assemblage or wheel 10 comprising a circular array of twelve percussive-ignitable flash lamps 12, a similar equal-numbered array of lamp holders 14 for the respective lamps, a lamp indexing disk 16, and a striker annulus 18. The flash lamps 12, the lamp holders 14, the lamp indexing disk 16 and the striker annulus 18 are connected together via a pair of coaxial single-flange end studs 20 and 22 and one coaxial two-flange intermediate stud 24 for unitary rotation about a center axis X.

The flash lamps 12 are a known chemical type in that they comprise a hermetically sealed transparent glass housing 26, a combustion-supporting gas fill such as oxygen inside the housing, a filamentary combustible material such as shredded zirconium or hafnium foil which is rapidly burned inside the housing to produce flash illumination, and a primer bead connected inside the housing to an external ignition stem or ferrule 28 which is physically struck to ignite the flash lamp.

The lamp holders 14 have individual openings 30 in which the respective lamps 12 are securely held. See FIGS. 1 and 2. The glass housing 26 and the ignition stems 28 of the respective lamps 12 protrude from opposite ends of the openings 30 as shown in FIG. 3.

A torsionally resilient support ring 32 supports each one of the lamp holders 14 evenly spaced in a circle for tilting movement relative to the other holders to tilt the respective lamps 12 ninety degrees from individual storage orientations to individual ignition orientations as shown in FIG. 3. The storage orientations of the respective lamps 12 are identical substantially vertical orientations, and the ignition orientations of the respective lamps are identical substantially horizontal orientations in FIG. 3. The lamp holders 14 are fixed to the support ring 32, and the support ring is torsionally twisted when each one of the lamp holders is tilted relative to the other holders to tilt the respective lamps 12 from their storage orientations to their ignition orientations. The resilience of the support ring 32 biases or urges each one of the lamp holders 14 to move relative to the other holders to return the respective lamps 12 to their storage orientations from their ignition orientations.

The lamp indexing disk 16 includes a circular array of evenly spaced peripheral indexing fingers 34. The indexing fingers 34 have integral retaining clips 36 for holding the support ring 32 on the indexing fingers to locate the lamp holders 14 in respective spaces 38 between the indexing fingers. See FIGS. 1 and 2. As shown in FIG. 3, the lamp holders 14 are tilted within the spaces 38 to tilt the respective lamps 12 from their storage orientations to their ignition orientations.

The striker annulus 18 includes a plurality of striker fingers 40 equal in number to the plurality of flash lamps 12 for striking the ignition stems 28 of the respective lamps to ignite the flash lamps. Each one of the striker fingers 40 is arranged in a circle for movement relative to the other fingers from a relaxed position to a cocked position for striking the ignition stems 28, when each one of the lamp holders 14 is tilted relative to the other holders to change the respective lamps 12 from their storage orientations to their ignition orientations. As shown in FIG. 3, the lamp holders 14 have individual ledges 42 for supporting the striker fingers 40 in their cocked positions for movement off the ledges to strike the ignition stems 28.

The Camera

Figure 4:
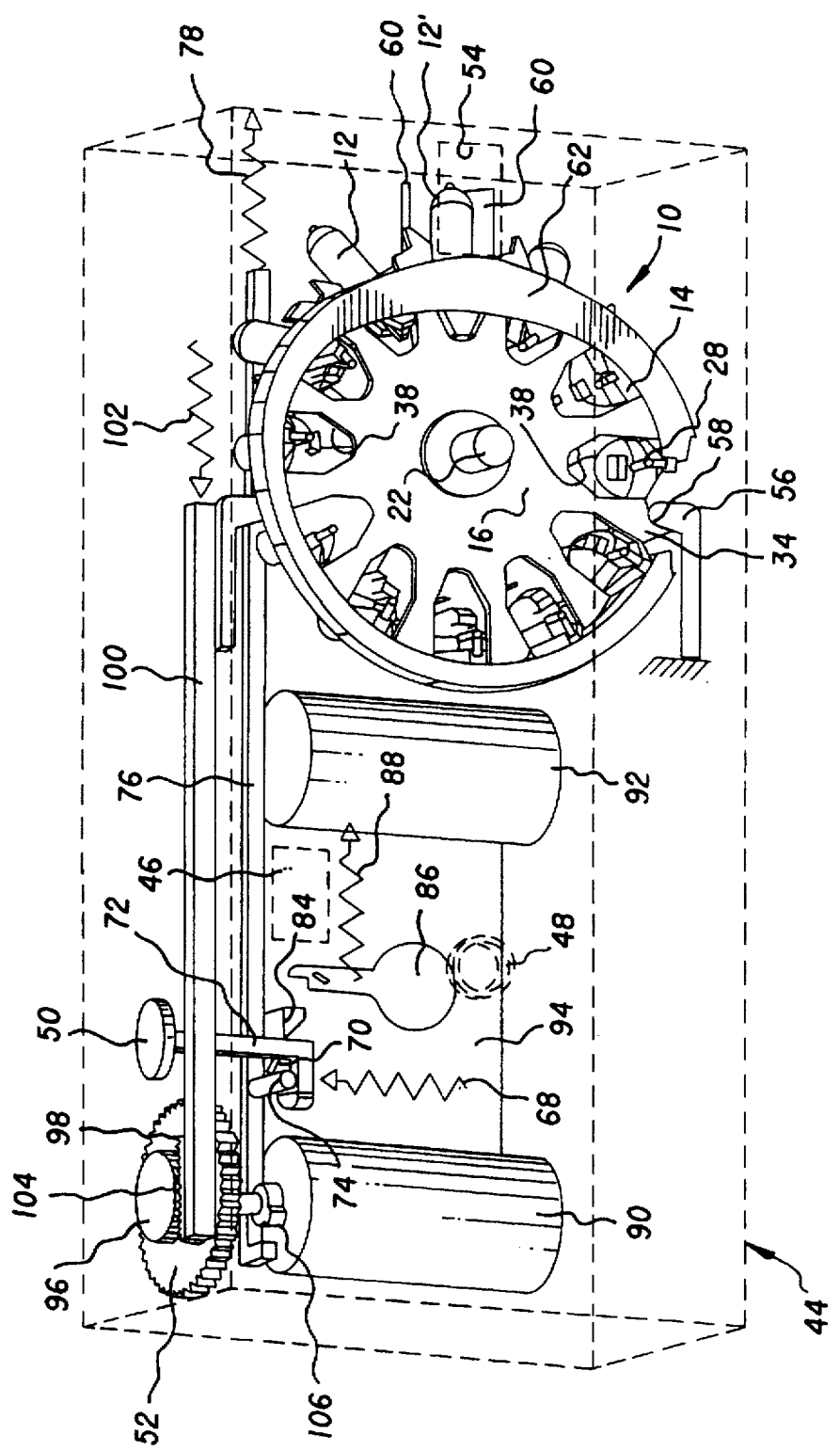
FIG. 4. is a front perspective view of the camera to be used with the multi-lamp flash wheel.
Figure 5:
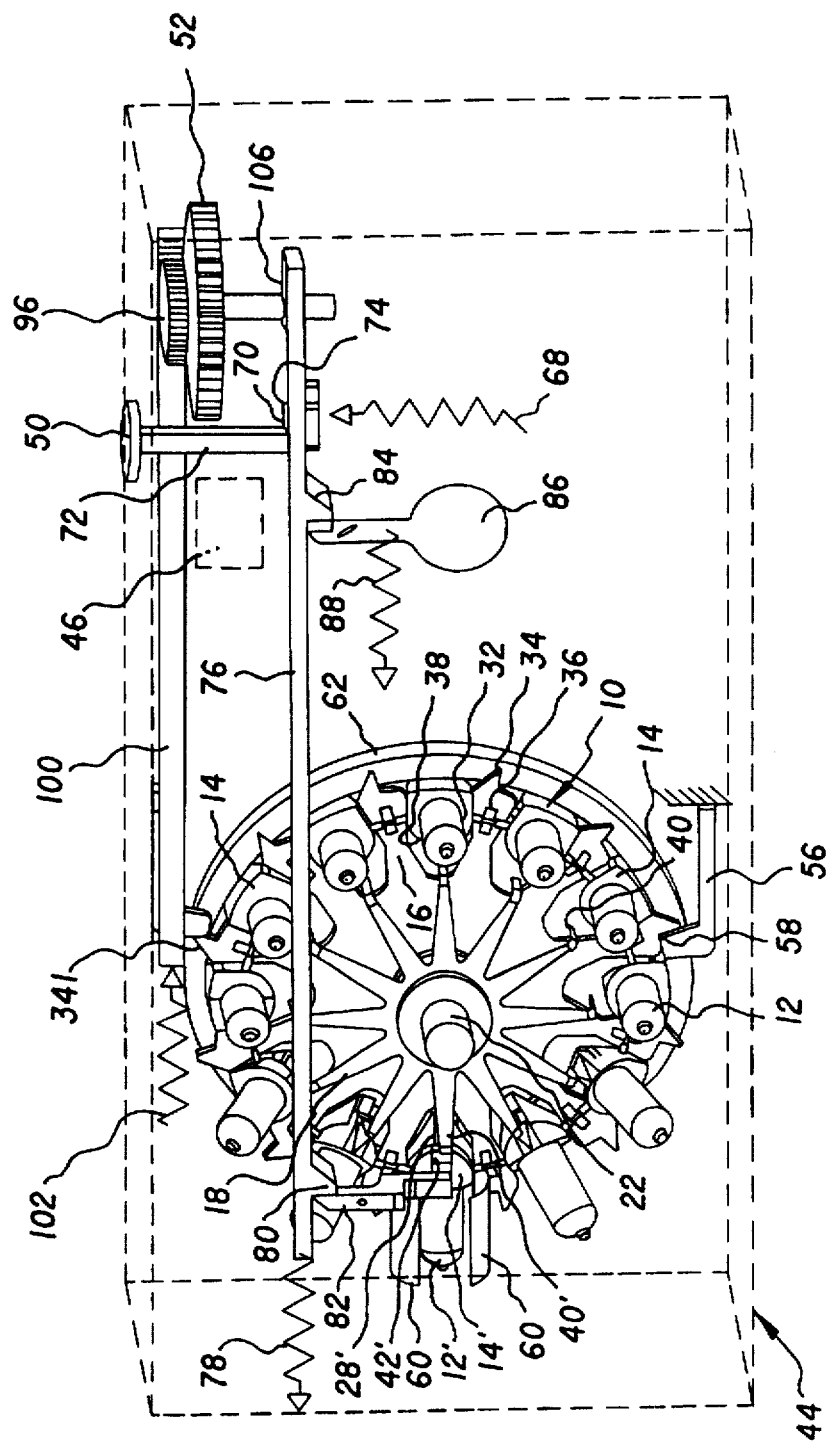
FIG. 5 is a rear perspective view of the camera.

A camera 44 which includes the multi-lamp flash wheel 10 is shown in FIGS. 4 and 5.

As shown in FIG. 4, the camera 44 has a front viewfinder window 46, a taking lens 48, a manually depressible shutter release button 50, a manually rotatable thumbwheel 52 and a flash emission window 54.

Known means in the camera 44, not shown, supports the multi-lamp flash wheel 10 at the end studs 20 and 22 for rotation about the axis X to move successive ones of the flash lamps 12 to and from behind the flash emission window 54. A flexibly resilient anti-backup pawl 56 engages successive ones of the indexing fingers 34 at respective notches 58 in the ends of the indexing fingers as the respective lamps 12 are positioned behind the flash emission window 54. See FIGS. 4 and 5. A known, split (two halves) flash reflector 60 is located proximate opposite sides of the flash emission window 54 to reflect flash illumination through the flash emission window.

A fixed cam ring 62 in the camera has an innercircumference cam hump 64 as shown in FIG. 3. When the multi-lamp flash wheel 10 is rotated to move successive ones of the flash lamps 12 to and from behind the flash emission window 54, the cam hump 64 pushes against a cam follower face 66 of the lamp holder 14' for the flash lamp 12' that is moved to behind the flash emission window to tilt the lamp holder relative to the other holders 14, which tilts the flash lamp relative to the other lamps from its storage orientation to its ignition orientation. See FIGS. 4 and 5. At the same time, the striker finger 40' for the flash lamp 12' which is moved to behind the flash emission window 54 is moved relative to the other fingers 40 from its relaxed position to its cocked position for striking the ignition stem 28' of the flash lamp. The striker finger 40' rests on the ledge 42' of the tilted holder 14', to be pushed off the ledge to strike the ignition stem 28' of the flash lamp 12'. See FIG. 3.

When the shutter release button 50 is manually depressed against the contrary urging of a return spring 68, a stop 70 projecting from a release stem 72 connected to the button is disengaged from a pin 74 projecting from a high-energy beam 76 to free the high-energy beam. The high-energy beam 76, in turn, is translated via an actuation spring 78 to the right in FIG. 4 and to the left in FIG. 5, first moving an integral tab 80 of the high-energy beam against a triggering lever 82. The triggering lever 82, in turn, is pivoted counterclockwise in FIG. 5, to kick the striker finger 40' off the ledge 42' to strike the ignition stem 28' and ignite the flash lamp 14' behind the flash emission window 54. Then, an integral tab 84 of the high-energy beam 76 is moved against a shutter blade 86 to pivot the shutter blade clockwise in FIG. 4 and counter-clockwise in FIG. 5 against the contrary urging of a return spring 88 to momentarily uncover the taking lens 48 in timed relation with flash ignition.

To re-initialize, the thumbwheel 52 is manually rotated counter-clockwise in FIG. 4 and clockwise in FIG. 5 to wind an exposed film frame into a cartridge chamber 90 and to advance a fresh film frame from an unexposed film roll chamber 92 to a film exposure plane 94. At the same time, a coaxial pinion 96 on the thumbwheel 52 is similarly rotated in engagement with a rack 98 on an indexing beam 100 to translate the indexing beam to the right in FIG. 4 and to the left in FIG. 5 against the contrary urging of a return spring 102. This makes the indexing beam 100 swing the indexing finger 34' in FIG. 5 to rotate the multi-lamp flash wheel 10 counter-clockwise one finger increment, to move the flash lamp 12' that has been ignited from behind the flash emission window 54 and move a flash lamp 12 that has not been ignited behind the flash emission window. A flat 104 on the pinion 98 is then positioned opposite the rack 98 to permit the return spring 102 to translate the indexing beam 100 to the left in FIG. 4 and to the right in FIG. 5 to re-engage the pinion and the rack. A coaxial reset extension 106 of the thumbwheel 52 is rotated with the thumbwheel to engage and pull the high-energy beam 94 to the left in FIG. 4 and to the right in FIG. 5 to reposition the triggering lever 82.

The invention has been described with reference to a preferred embodiment. However, it will be appreciated that variations and modifications can be effected by a person of ordinary skill in the art without departing from the scope of the invention. For example, the flash lamps 12 can be any known flash illumination source such as a conventional flash bulb, a flash powder or solid encased in a transparent covering as disclosed in prior art U.S. Pat. No. 3,751,656, issued Aug. 3, 1973, etc. Also, the multi-lamp flash wheel 10 can be built into or replaceable in the camera 44.

| PARTS LIST |
| --- |
| 10. multi-lamp flash wheel |
| 12. flash lamps |
| 14. lamp holders |
| 16. lamp indexing disk |
| 18. striker annulus |
| 20. single-flange end stud |
| 22. single-flange end stud |
| 24. two-flange intermediate stud |

PARTS LIST

- X. center axis
- 26. glass housings
- 28. ignition stems
- 30. openings
- 32. support ring
- 34. indexing fingers
- 36. retaining clips
- 38. spaces
- 40. striker fingers
- 42. ledges
- 44. camera
- 46. front viewfinder window
- 48. taking lens
- 50. shutter release button
- 52. thumbwheel
- 54. flash emission window
- 56. anti-backup pawl
- 58. notches
- 60. flash reflector
- 62. cam ring
- 64. cam hump
- 66. cam follower faces
- 68. return spring
- 70. stop
- 72. release stem
- 74. pin
- 76. high-energy beam
- 78. actuation spring
- 80. tab
- 82. triggering lever
- 84. tab
- 86. shutter blade
- 88. return spring
- 90. cartridge chamber
- 92. unexposed film roll chamber
- 94. film exposure plane
- 96. pinion
- 98. rack
- 100. indexing beam
- 102. return spring
- 104. flat
- 106. reset extension

We claim:

1. A multi-lamp flash assemblage comprising a plurality of flash lamps arranged in respective storage orientations, is characterized by:

support means supporting each one of said flash lamps for movement relative to the other lamps to change the respective lamps from their storage orientations to ignition orientations which are different than the storage orientations; and resilient means for biasing each one of said flash lamps for movement relative to the other lamps to return the respective lamps to their storage orientations from their ignition orientations.

2. A multi-lamp flash assemblage comprising a plurality of flash lamps arranged in respective storage orientations, is characterized by:

support means supporting each one of said flash lamps for movement relative to the other lamps to change the respective lamps from their storage orientations to ignition orientations which are different than the storage orientations;

a plurality of striker fingers equal in number to said plurality of flash lamps for striking ignition stems of the respective lamps to ignite said flash lamps; and means supporting each one of said striker fingers for movement relative to the other fingers from a relaxed position to a cocked position for striking said ignition stems, when the respective lamps are changed from their storage orientations to their ignition orientations.

3. A multi-lamp flash assemblage comprising a plurality of flash lamps arranged in respective storage orientations, is characterized by:

support means supporting each one of said flash lamps for movement relative to the other lamps to change the respective lamps from their storage orientations to ignition orientations which are different than the storage orientations; and including a plurality of lamp holders for the respective lamps and a support ring that supports each one of said lamp holders in a circle for movement relative to the other holders to change the respective lamps from their storage orientations to their ignition orientations.

4. A multi-lamp flash assemblage as recited in claim 3, wherein said plurality of lamp holders are fixed to said support ring and said support ring is twisted to permit each one of said lamp holders to be tilted relative to the other holders to change the respective lamps from their storage orientations to their ignition orientations.

5. A multi-lamp flash assemblage as recited in claim 4, wherein said support ring is torsionally resilient to bias each one of said lamp holders to move relative to the other holders to return the respective lamps to their storage orientations from their ignition orientations.

6. A multi-lamp flash assemblage as recited in claim 3, further characterized by:

a lamp indexing disk including a circular array of evenly spaced indexing fingers and integral retaining means for holding said support ring on said indexing fingers to locate said lamp holders in respective spaces between the indexing fingers.

7. A multi-lamp flash assemblage as recited in claim 3, further characterized by:

a plurality of striker fingers equal in number to said plurality of flash lamps for striking ignition stems of the respective lamps to ignite said flash lamps; and means supporting each one of said striker fingers in a circle for movement relative to the other fingers from a relaxed position to a cocked position for striking said ignition stems, when each one of said lamp holders is moved relative to the other holders to change the respective lamps from their storage orientations to their ignition orientations, and wherein said lamp holders have individual ledges for supporting the respective strikers in their cocked positions for movement off said ledges to strike said ignition stems.

8. A camera comprising a plurality of flash lamps arranged in respective storage orientations, is characterized by:

actuation means for moving each one of said flash lamps relative to the other lamps to change the respective lamps from their storage orientations to ignition orientations which are different than the storage orientations; and resilient means for biasing each one of said flash lamps for movement relative to the other lamps to return the respective lamps to their storage orientations from their ignition orientations.

9. A camera intended to be used with a multi-lamp flash assemblage having a circular array of flash lamps arranged in respective storage orientations and support means supporting each one of the flash lamps for movement relative to the other lamps to change the respective lamps from their storage orientations to ignition orientations which are different than the storage orientations, comprises:

a flash emission window;

indexing means for positioning successive ones of the flash lamps behind said flash emission window; and a fixed cam ring for moving each one of the flash lamps relative to the other lamps to change the respective lamps from their storage orientations to their ignition orientations as the respective lamps are positioned behind said flash emission window.

* * * * *